Dec. 11, 1928.

L. CASPER 1,694,769

TELEGRAPH TRANSMISSION OF SIGNALS

Filed Aug. 1, 1921     7 Sheets-Sheet 1

INVENTOR.

Louis Casper

Dec. 11, 1928.

L. CASPER 1,694,769

TELEGRAPH TRANSMISSION OF SIGNALS

Filed Aug. 1, 1921      7 Sheets-Sheet 2

INVENTOR.
Louis Casper

L. CASPER

TELEGRAPH TRANSMISSION OF SIGNALS

Filed Aug. 1, 1921  7 Sheets-Sheet 4

INVENTOR.
Louis Casper

Dec. 11, 1928.

L. CASPER 1,694,769

TELEGRAPH TRANSMISSION OF SIGNALS

Filed Aug. 1, 1921  7 Sheets-Sheet 5

INVENTOR.
Louis Casper

Dec. 11, 1928.

L. CASPER

TELEGRAPH TRANSMISSION OF SIGNALS

Filed Aug. 1, 1921  7 Sheets-Sheet 6

Louis Casper
INVENTOR

Patented Dec. 11, 1928.

1,694,769

UNITED STATES PATENT OFFICE.

LOUIS CASPER, OF BROOKLYN, NEW YORK.

TELEGRAPH TRANSMISSION OF SIGNALS.

Application filed August 1, 1921. Serial No. 488,914.

My invention relates to improvements in means for the correction of distortions of signal waves or the like during their process of transmission over a line wire, and has for its object to provide a simple efficient arrangement inexpensive to install or maintain whereby signal waves during their process of transmission over a line wire may retain as nearly as possible their original contour. In attaining this object, my invention as far as I can ascertain, acts in a dual capacity, first, in draining extraneous induction from such circuits to which it is applied; and, second, in improving the shape of the signal waves as they are being transmitted over a line wire or cable that is subject to variable factors of inductive interference or attenuation, and for the reasons cited it has a value in its application upon circuits where it is difficult to obtain a duplex balance, as for example, in case of a loaded submarine cable on which duplex or simultaneous operation in both directions is being attempted.

To these ends my invention consists in the combination of elements hereinafter more particularly described and definitely pointed out in the claims.

Reference is had to the accompanying drawings forming a part of this specification in which corresponding letters of reference in the different figures indicate like parts.

Referring to the drawings.

Fig. 13 represents a partial view of a modification of commutators 5 and 6 shown in Figs. 2 and 3. This modification comprises the equivalent of the two latter commutators combined into one face plate for better illustration. This figure furthermore shows the manner in which a transmitted signal or pulse over a line is subjected to innumerable breaks; also showing the manner in which the line is grounded on one side of the same simultaneous with the breaks aforementioned.

Figure 1:
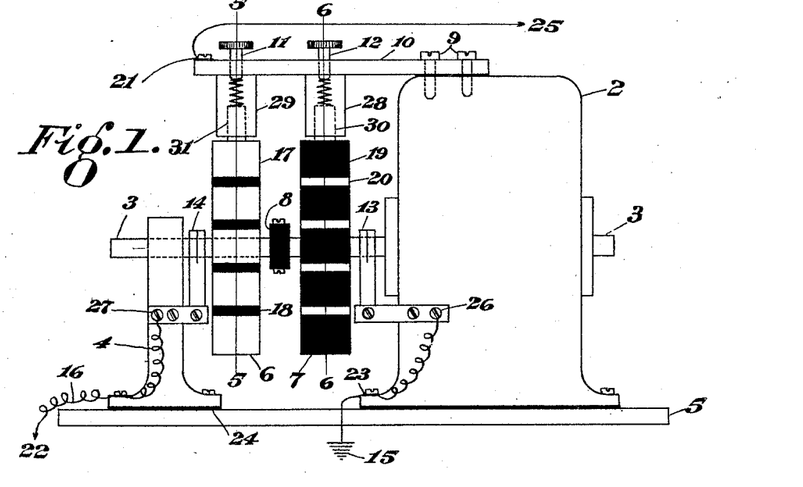
Fig. 1 is a side view of the induction arrangement.

Referring to Fig. 1, 2 is a motor which may be either direct or alternating current type, having a shaft 3 and is supported at one end of said motor by end bearing 4. Said end bearing rests on insulated plate 24 at its base which insulates said end bearing from the metal base 5 as shown. Attached to the shaft 3 are commutators 6 and 7. The shaft 3 is split and joined together by a collar 8 which is made up of some non-conducting material. This insulates the commutators 6 and 7 from each other. 29 is a brush holder inside of which is a brush 31, the said brush bears on commutator 6.

28 is a brush holder having a brush 30, the said brush bearing on commutator 7. 10 is a projection, secured to the motor frame by screws 9 and which supports the brush holders 29 and 28. 13 is a combined brush and holder, the brush of which also bears on shaft 3, but as already indicated, is not in metallic contact with that section of shaft 3 on which the brush and holder 13 are in contact. 14 is a brush and holder.

These latter two brushes constitute electrical conducting mediums whereby the current passes through the metallic portions of commutators 6 and 7, and affords a direct path for the current to pass from either the brushes 29 or 28 through the commutators aforesaid to the ground 15 at binding post 23 or to the operating set of apparatus 22 at binding post 16, respectively.

17 are metallic segments of commutator 6. 18 are insulated sections between the segments 17. 19 are insulated sections on commutator 7. 20 are narrow metallic segments between insulated sections 19.

The operation of the arrangement as shown in Fig. 1 is as follows:

The commutators 6 and 7 on shaft 3 revolve at a high rate of speed impelled by motor 2. The line wire 25 is connected to binding screw 21 which makes electrical connection with metallic projection 10 and in turn with brush holders 29 and 9. As shown in cross-section in Fig. 2, the commutator 6 is made up of metal except the insulated sections 18. The commutator 7 is likewise made up of metal except the insulated sections 19 shown in detail in Fig. 3.

Figure 2:
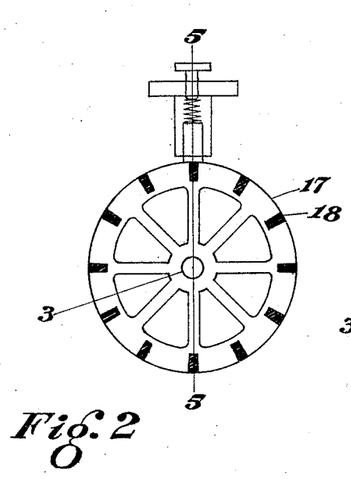
Fig. 2 is a detail of Fig. 1, showing a cross-section on a line 5—5 of commutator 6.
Figure 3:
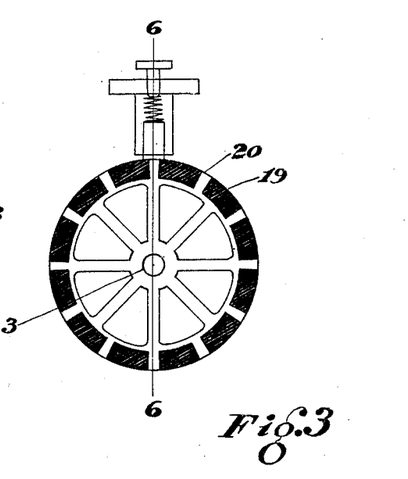
Fig. 3 is a similar detail showing a cross-section on a line 6—6 of commutator 7.

The current from the line 25 passes through the commutator 6 and from thence through the brush holder combination 13 to the terminal apparatus set at 16 except when interrupted by the insulated sections 18. These interruptions owing to the high revolving speed of the commutators are of momentary duration, so short in fact that there is very little perceptible difference in the regular line current flow due to these interruptions or momentary "breaks." At the instant the "breaks" occur in the commutator 6, a connection is made from the line to the ground 15 through the commutator 7 by means of segments 20 of the latter commutator. This has the effect of momentarily grounding the line either through a condenser or a resistance at the exact instant when the "break" in the line connection is made by the insulated sections 19 in commutator 6.

The effect of this arrangement is twofold: First, the regular current flowing on the line in obedience to, and as a result of an impressed electromotive force directed by a transmitting medium either hand or automatically operated at either or both of the line terminals will tend to follow its regular channel, that is to say, the current will flow beginning from the grounded generator at one end of the line to the apparatus at the other end of the same to the ground thus completing its regular circuit. The momentary interruptions or "breaks" make no material difference in this regular circuit flow except to slightly reduce the current amplitude which is not important when it is taken into consideration that the circuit is drained of extraneous current interference by reason of this arrangement.

With such foreign currents that have induced themselves on the line, the flow of the same is different from that of the regular line flow. These extraneous currents are set up from a variety of causes, as has already been intimated and are generally extremely erratic in frequency and intensity. The tendency of these currents is to discharge themselves in the case of grounded circuits to earth at such periods when the regular main line current is at its lowest value and does so in accordance with Ohm's law by following the path of the least resistance. A ready path is provided for these extraneous currents to flow directly to earth when the line is actually cut through the break caused by the insulated sections 18 and a ground conductor provided through the segments 20 which are in exact synchronous relation with the aforesaid insulated sections 18.

The extraneous currents quickly discharge themselves through the conducting medium momentarily presented as described and before they can build themselves up again to an approximate maximum value, the drain conducting medium as described above, presents itself again and as already stated is of such short duration as not to affect the regular signals flowing on the line.

Figure 4:
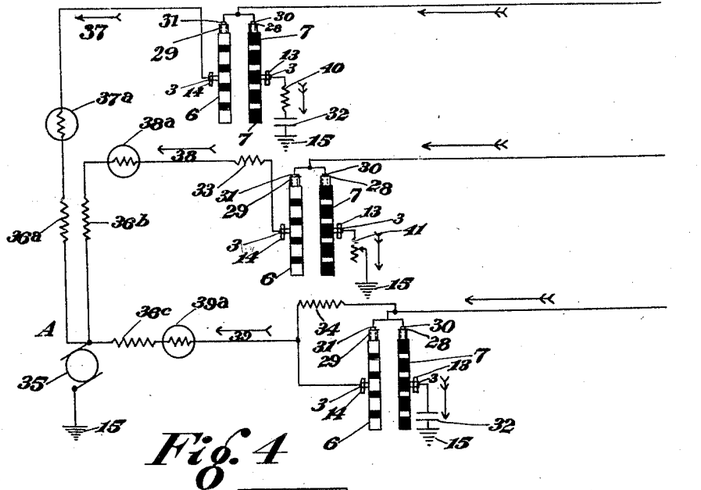
Fig. 4 shows various modifications of the arrangement as applied to a series of parallel lines.

The second effect of this arrangement is to break up the harmonic factor in such cases where a number of parallel lines as shown in Fig. 4, operate with current coming from one generator at one or both of the terminal stations of said parallel lines. The commutator of the motor-generator 35 is divided up into a number of conducting segments, each segment being insulated from its neighbor. These insulated sections cause a "ripple" flow of current due to the momentary rise and fall of the potential because of the insulated breaks between the commutator segments as stated. In this manner all parallel wires thus connected up have the same "ripple" current flow which tends to create between such parallel wires a harmonic effect and by reason of such effect, will produce a certain amount of mutual induction. The mutual indusctance produced by the foregoing is comparatively slight to be sure, but is nevertheless a limiting factor towards the attainment of greater efficiency in the carrying capacity of parallel telegraph lines.

The introduction of individual commutators 6 in series with each of the parallel wires and each commutator revolving at slightly different speeds will have the effect of breaking up the harmonic "ripple" referred to.

In further reference to Fig. 4. Three parallel lines, 37, 38, 39 are shown. All three lines obtain current supply from generator 35 through resistances $36^a$, $36^b$, $36^c$. On each of the three lines different methods of connecting up the arrangement are shown. On line 37 the drain arrangement consists of commutators 6 and 7, the former being connected directly in the line through brush holder 29 and brush 31. Commutator 7 "taps" the line 37 through brush holder 28 and brush 30 and provides a momentary path to earth through resistance 40 and condenser 32. The period when this momentary path occurs is simultaneous with a period when the line is opened momentarily by means of commutator 6. The regular line current flow is shown by the double feathered arrow which with the aid of the drain provided by commutator 7 is cleared of interference by providing a ready path of escape to earth for the latter at a time when the regular line circuit is interrupted. The single feathered arrow shows the current cleared of extraneous current interference flowing toward the receiving apparatus $37^a$.

Line 38 is similarly equipped with an inductance drain arrangement having a resistance 33 in series with the line between the drain arrangement and the receiving apparatus $38^a$. This resistance may be either inductive or non-inductive.

The resistance 33 is desirable in certain cases to act as an impedance to the incoming interference. This interference is afforded momentarily a better and less impeding path to the earth through commutator 7 and resistance 41, simultaneously with the momentary opening of the line through commutator 6 in a manner similar to that described in reference to wire 37. $38^a$ indicates the receiving apparatus in circuit with line 38.

Line 39 is likewise equipped with the inductance drain arrangement somewhat modified. The inductance coil 34 bridges the drain which has the effect of impeding the flow of the current toward station A. This check is momentary and occurs when the insulated sections 18 of commutator 6 break the continuity of current flow through said commutator to terminal A. At that instant two paths for extraneous currents are presented, viz., one through the inductance 34 and the other through a metallic segment in commutator 7 to earth 15 through condenser 32. There being no material impedance in the latter path, the extraneous currents will more readily flow through it rather than through the inductance 34. $39^a$ represents the receiving apparatus in series with line 39, the former may be either a relay, printer, telephone receiver or other similar device.

Figure 5:
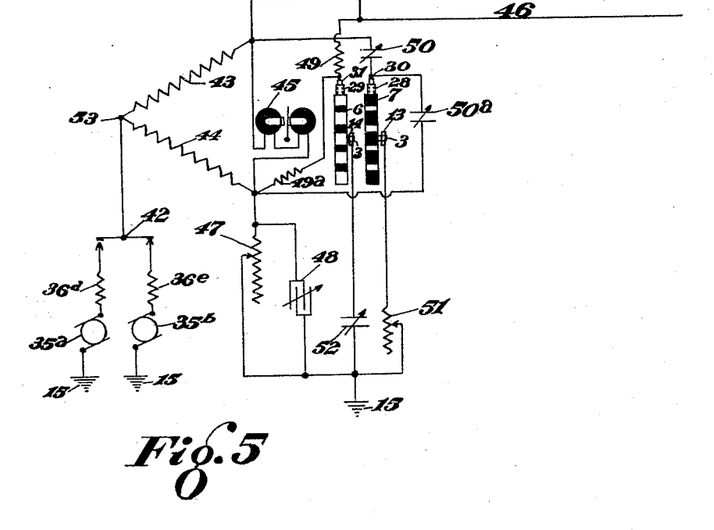
Fig. 5 illustrates a method of applying the arrangement to a bridge type duplex telegraph circuit.

Referring to Fig. 5, 42 is a telegraph pole-changer which alternately sends currents of different polarities to the line by means of generators $35^a$, $35^b$, the currents from which flow through resistances $36^d$ and $36^e$. 43 and 44 are resistance arms of a bridge duplex. 45 is a polar relay which bridges across the resistance arms 43 and 44. One terminal of the same connects with line wire 46 and the other terminal to the artificial line 47, thence to earth 15. 48 is an adjustable condenser to compensate for the capacity of the line. 53 is the apex or battery split.

The wave correcting arrangement is likewise bridged across resistance arms 43 and 44. This arrangement consists of resistances 49 and $49^a$ and at the center of both resistances aforesaid a "tap" is made with brush holder 29 and brush 31 to commutator 6. The brush 14 connects with adjustable condenser and thence to earth as shown.

The commutator 7 is likewise "tapped" between the adjustable condensers 50 and $50^a$ which are bridged across the bridge resistances 43 and 44. The "tap" connection for commutator 7 is made with brush holder 28 and brush 30 which bears on the commutator 7 aforesaid. The brush 13 connects with adjustable resistance 51 and from thence to earth 15.

The operation of the arrangement as shown in Fig. 5 is as follows:

The incoming current meets with impedance in the combination of the coils of the polar relay 45 and bridge arm 43. The current, however, meets momentarily with less impedance to earth through resistances 49 and $49^a$, assuming of course that the commutators 6 and 7 are revolving. A certain portion of the main line current will momentarily flow to the earth through the adjustable condenser 52. The character of the current flowing through the circuit including the condenser 52 as described, would be in the nature of electrostatic induction. Such path is preferable to two other branch paths leading to earth, one by way of bridge resistance 43 and the other through the polar relay 45.

A further drain for extraneous currents is provided by commutator 7. At the periods when the brush 30 bears on the insulated sections of commutator 7, a path is provided by the bridging connection which includes the adjustable condensers 50 and $50^a$ that offer considerable impedance to the current flow due to the fact that both condensers 50 and $50^a$ are in series with each other which reduces the capacities of the condensers to the sum of the reciprocal of the condensers aforesaid. When, however, a segment is in momentary contact with the brush 30, a ground "tap" connection is made at the center of the bridging circuit between the condensers 50 and 50ª which places the condensers aforesaid in parallel flowing toward the earth as shown. This at once builds up the capacity of the two condensers 50 and 50ª to their rated individual values.

In this manner a substantial path is provided for extraneous currents to flow momentarily to earth from the line in the manner described.

A further improvement is effected by so arranging the segments of commutator 6 that the instant the drain path is interrupted by said commutator 6 in connection with the bridging circuit connected thereto, a connection is made with the earth through commutator 7 in connection with the bridging circuit with which the commutator 7 is "tapped."

In this manner both the bridging circuits to which commutators 6 and 7 are respectively attached alternately provide an inductance drainage path to earth and does so without disturbing or retarding the normal action of the main line relay.

Figure 6:
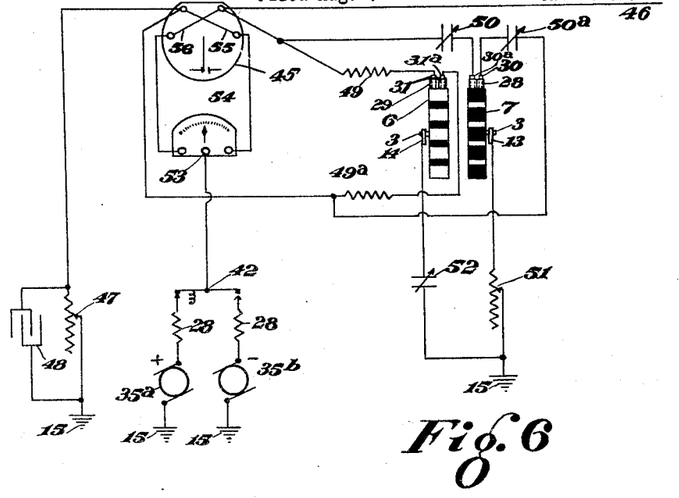
Fig. 6 shows a modification of the drainage arrangement, the same being applicable to either differential or bridge type duplex telegraph circuits.

Referring to Fig. 6 which diagrammatically illustrates a terminal differential polar duplex apparatus set. As in Fig. 5, 45 is a polechanger which alternately connects generators 35ª, 35ᵇ through resistances 36ᵈ, 36ᵉ to the main and artificial lines through the "split" 53 at mil-ammeter 54, the artificial line side passing from the right hand connection of said mil-ammeter through artificial line coil 55 to artificial line resistance 47 to earth 15. Artificial line capacity 43 is connected up as shown. The line side of the duplex circuit passes from the left hand side of mil-ammeter 54 to the line coil 56 of polar relay 45 and from thence to line 46.

The drainage arrangement is bridged across the main line and artificial line coils as shown and is somewhat modified over the arrangement shown in Fig. 5 in that two brushes bear on the periphery of each of the commutators 6 and 7. From the line side terminal of coil 56, the coil 49ª is connected and which in turn is connected to brush holder 29 and brush 31. From the artificial line side terminal of coil 55 is connected to coil 49 and which in turn is connected to brush holder 29ª and brush 31ª. The brushes 31, 31ª bear on commutator 6. The brush 14 bears on shaft 3 and is in connection with the earth 15 through condenser 52. From the terminal of coil 55 another connection is made to condenser 50 and from thence to brush 30. From the terminal of coil 56 another connection is made to condenser 50ª and from thence to brush 30ª. The brush 13 bears on shaft 3ª and is in connection with the earth 15 through resistance 51.

The method of operation of this arrangement is as follows:

The current coming in from the line is partially diverted through the coil 49 passing through the brushes 31, 31ª at a time when aforesaid brushes bear on a metallic segment on commutator 6. When this occurs the current passes on through coil 49ª and artificial line resistance 47 to earth 15. Simultaneously, connection is made with shaft 3 which is in metallic connection with metal segments 17 making an earth connection through condenser 52.

This has the effect of draining extraneous currents from the line without unbalancing or retarding the polar relay 45.

An additional drain is also provided by the commutator 7 which alternates in effect with the drain circuit including commutator 6. This circuit comprises a bridge across the relay 45 connected up as described and is effective when the brushes 30, 30ª simultaneously bear on one of the metallic segments 20 on commutator 7. When this occurs a portion of current from the line passes across the bridge circuit to earth through artificial coil 47. Another path is provided through shaft 3ª which is in metallic connection with the segments 20 of commutator 7 which leads to earth through adjustable resistance 51.

These two drains while acting distinctly by reason of their alternative action through different capacities and resistances together with different contact intervals and alternating interrupting periods through which current can flow across each of the bridging circuits, has the effect of greatly clarifying incoming signals of extraneous current or other interference and with a minimum of lag to the polar relay 45 and without unbalancing the same.

Figure 7:
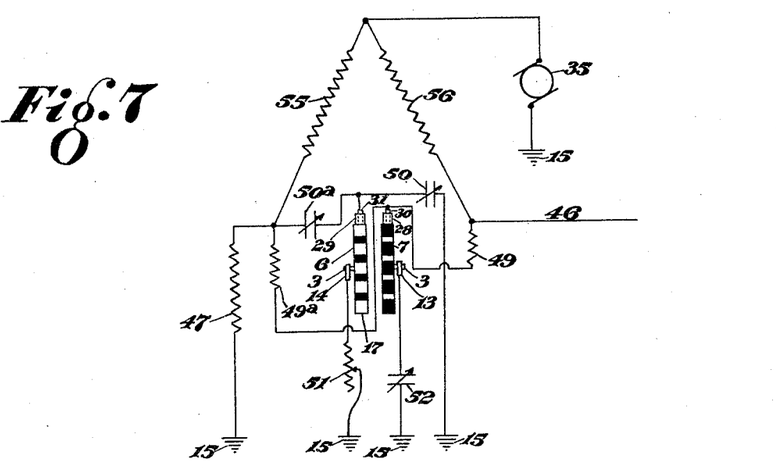
Figs. 7, 8 and 9 are schematic drawings showing various methods of bridging across a main line relay with the arrangement included in the bridging connections.

Fig. 7 is illustrative of a schematic modification of the drainage arrangement as applied to a polar relay. 35 is the generator either positive or negative, earthed at one terminal. The other terminal of said generator passes through the artificial line coil 55 thence to artificial line resistance 47 to earth on one side. On the other side the generator 35 passes through the line coil 56 to the line 46. The arrangement is bridged across the main line and artificial line coils as shown. This arrangement consists of two separate circuits the first from the artificial line coil terminal side to condenser 50ª to brush 31 and thence to condenser 50 to the line coil terminal side. The brush 31 connects with commutator 6 which connects with the earth when the brush 31 is in contact with metallic segments 17, thence to shaft 3 to resistance 51 and ground 15.

The second circuit bridges at the terminal side of artificial coil 50ª to resistance 49ª to brush 31, to resistance 49 and to the terminal side of line coil 56. The brush 31 connects the commutator 7 to earth when one of the metallic segments 20 of said commutator 7 is in contact with brush 30 which permits a path through shaft $3^a$, brush 13 and condenser 52.

The effect of this arrangement is similar to that described in Fig. 5 and may be applied in such cases when the extraneous currents or other influences are of such a character that this particular method would respond most beneficially.

Figure 8:
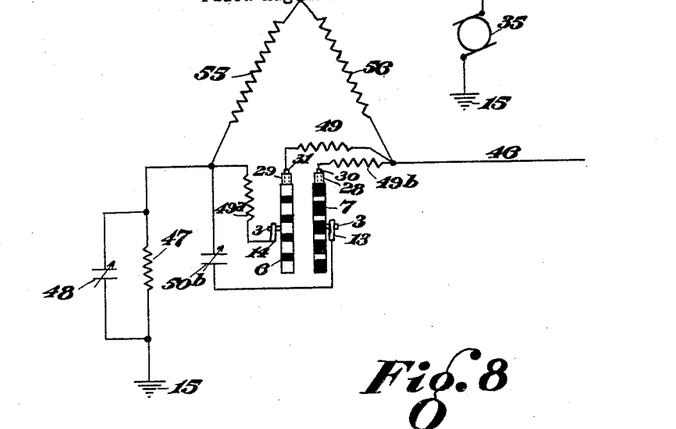

Fig. 8 is another modification and is shown schematically as in Fig. 7. In this arrangement the ground drain is through the artificial line resistance as one path and the coils 55 and 56 through the generator 35 to earth 15 as another path. 49, $49^a$, $49^b$ are resistance coils in the drain circuits. $50^b$ is an adjustable condenser in series with the circuit including the comutator 7.

Figure 9:
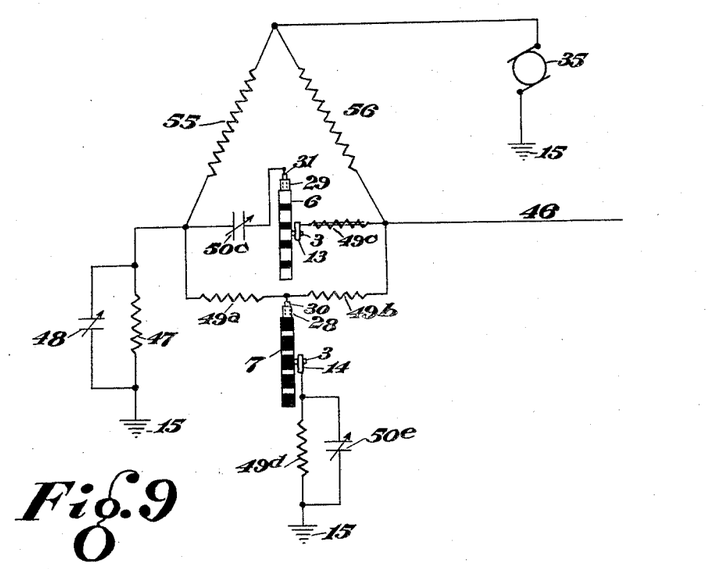

Fig. 9 is another modification shown schematically. Across the main line and artificial coils 55, 56, two extraneous current drain branches are provided. The first branch passes from the terminal side of artificial line coil 55 to adjustable condenser $50^c$ to brush 31 to commutator 6 to inductive resistance $49^c$ to the terminal side of the line coil 56. The second branch passes from the terminal side of artificial line coil to resistance $49^a$ to brush 30 of commutator 7 to resistance 49 to the terminal side of the line coil 56. A ground path is provided at the ohmic center of this latter branch from the brush 30 through commutator 7 to earth through condenser $50^e$ and $49^d$ the latter condenser and resistance shown in parallel. The condenser $50^e$ and $49^d$ may also be operated in series to earth. The above arrangement is applicable in cases where there is considerable extraneous power current.

Figures 10, 11:
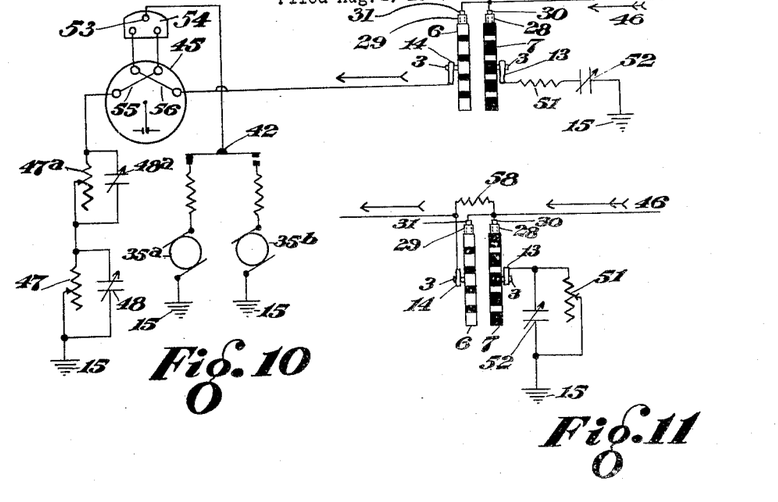
Fig. 10 shows the principle in a duplexed circuit connected directly in the line.
Fig. 11 shows a modification of the principle, applicable in lieu of the scheme shown in Fig. 10.

In Fig. 10, a diagram of a telegraph polar duplex is shown. $35^a$, $35^b$ are generators which in turn impress current into the circuit controlled by the polechanger 42. The current from either of the above mentioned generators passes through the "split" point 53 at the mil-ammeter 54 and divides into two branches, one branch flowing through the artificial line coil 55 of relay 45 to compensating resistance $47^a$ and artificial line resistance 47 to earth 15. The second branch flows from the split through line coil 56 of relay 45 to the line 46. The induction drain arrangement is connected in at some section of the line 46 as shown. The current from the line flows through brushes 30, 31. The flow through brush 31 passes through the revolving commutator 6 to shaft 3 to brush 14 and from thence into the receiving relay 45. The action of the drainage arrangement is similar to that described in Fig. 4. In such cases where the drainage arrangement is connected up as shown, it is necessary to compensate in the artificial line of said polar duplex for any impedance created by the drainage arrangement connected in some section of the line. This is done by the resistance $47^a$ and condenser $48^a$ both of which are adjustable as to inductive reactance in the case of the resistance $47^a$ and capacity reactance in the case of the condenser $48^a$.

Figure 12:
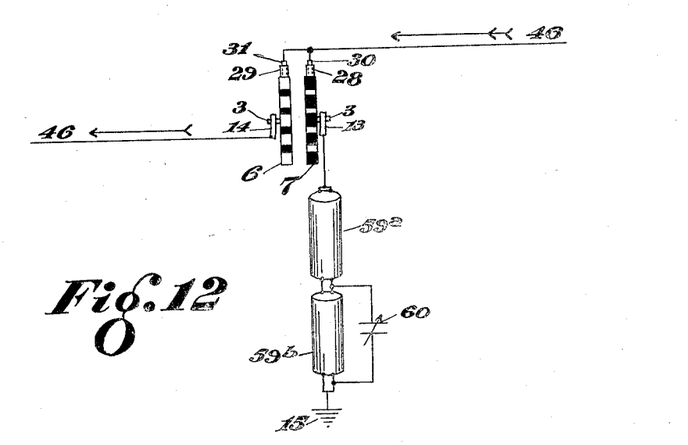
Fig. 12 is a modification of Fig. 11.

Figs. 11 and 12 are other modifications of the drainage arrangement. The action of the commutators 6 and 7 is similar to that shown in Fig. 4 describing the action of the extraneous current drain on the line wire 37 in said figure. The ground drain through commutator 7 is effected through two carbon or graphite cylinders $59^a$, $59^b$ in series between the brush of commutator 7 and the earth in Fig. 12 or through condenser 52 and resistance 51 in Fig. 11. Connected between the graphite cylinders aforesaid is a condenser 60, the opposite terminal of which leads to the earth 15.

The action of the graphite cylinders in Fig. 12 in connection with condenser 60 is as follows:

The graphite cylinders have comparatively high ohmic resistance but a maximum surface in and outside of the cylinders aforesaid. The character of the extraneous currents to be drained is such that they are more inclined to flow on the surface of such a conductor; thus, the larger the surface the better the path provided for the flow of extraneous currents.

If, then, a conducting path is provided for such extraneous currents having a maximum surface area and a high ohmic resistance as described, the resulting effect would be that the regular line flow would be retarded in its flow to earth by way of the graphite cylinders, due to the comparatively high resistance of the same. At the same time, however, the extraneous currents having little or no penetrative effect flow along the larger surface with greater facility regardless of the high resistance of the earth path as provided by the high resistance graphite cylinders as shown.

The condenser 60 is intended as an additional path in such cases where extraneous currents will not readily flow through both graphite cylinders $59^a$ and $59^b$. There may be any number of graphite cylinders and intervening condenser paths to the ground; Fig. 12 merely illustrates the method of employing a condenser in this connection with only two cylinders.

The arrangement just described as well as the drain arrangements shown in Fig. 4 are applicable to any multiplex or quadruplex telegraph circuit and are also applicable to telephone circuits; of the latter, grounded circuits in particular.

Figure 13:
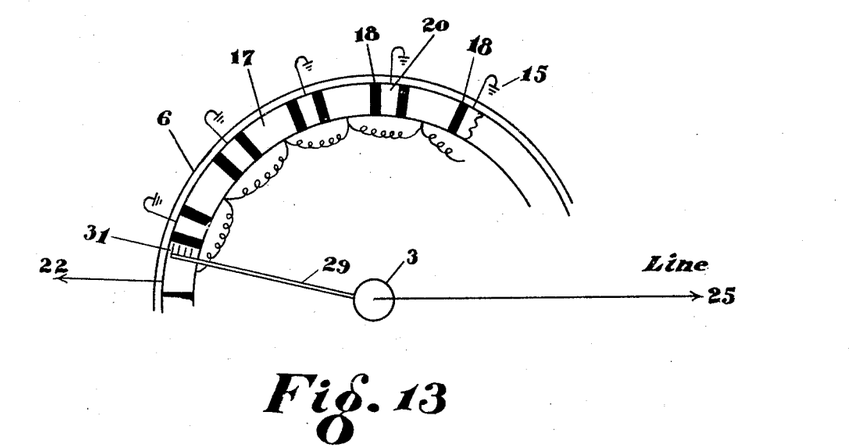
Figure 14:
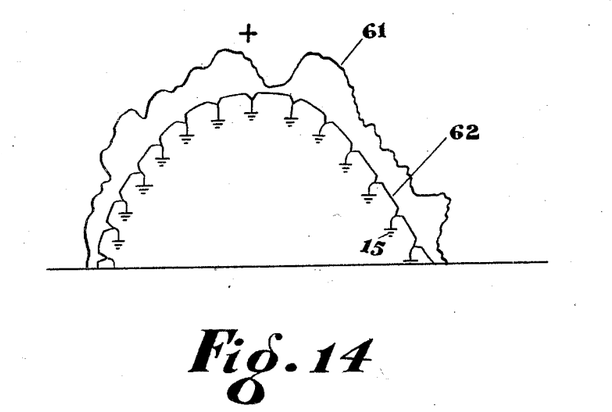
Fig. 14 illustrates graphically the clarifying effects of the "breaks" and "grounds" upon a signal during its course of transmission upon a line wire as it approaches the receiving apparatus.

In further reference to Figs. 13 and 14.

A transmitted signal passing along a line is being continually broken through the action of brush 31 wiping against segments 17 and 20. The brush 31 is connected to holder 29 which in turn is connected to shaft 3 which is revolved by a motor similar to motor 2, Fig. 1. The shaft 3 in turn is connected electrically to the line 25 as shown. All the segments 20 which, as already stated, have a smaller contact surface than segements 17, are grounded. Segments 20 are connected together electrically as shown. When the brush 31 is revolving which would necessarily have to be at a high rate of speed, it passes over both segments 17 and 20. The intervening insulation 18 between the segments causes a momentary break in the continuity of the signal, and at a point during the period of this momentary break in the signal, one side of the line 25 is grounded while the other side of the line 22, i. e., the side nearest to the terminal station, is opened. The duration of the grounding of the line, as it has already been stated, is extremely small occurring only while the brush 31 is passing over segements 20 and is not sufficient to interfere with the functioning of the signal on its arrival at the receiving end.

This is further exemplified by the graphic diagram in Fig. 14. The curve 61 illustrates a signal wave as would appear on an oscillograph, and which we will assume to be positive, rising from the zero line to its crest then falling back to the zero line again in response to manipulations of the distant battery through the controlling medium of a transmitter. Owing to parallel or other induction impressing itself upon a line, the signal as shown by curve 61, loses much of its normal characteristic, being in this case considerably distorted because of such induction. In some cases, of course, the distortion is less than shown in curve 61 and in other cases it is even greater.

The effect of the introduction of numerous openings simultaneous with the momentary grounding of the line tends to make the signal curve more consistent and is therefore more readily translatable by whatever apparatus is connected to the line circuit at its receiving terminal.

From the foregoing it is seen that a means is provided to improve the reception of signals on a line wire and these means are not necessarily associated with either the transmitting or receiving apparatus at either end of the line.

Figure 15:
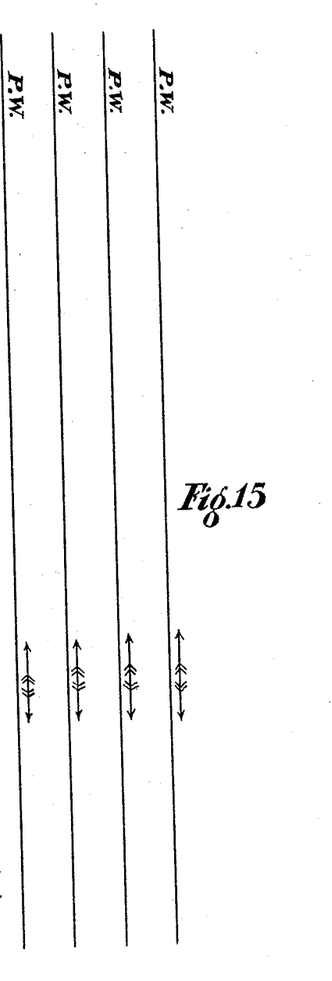
Fig. 15 illustrates a line with transmitting and receiving apparatus at stations A and B and is also equipped with drains for extraneous currents at stations C and D.

Referring to Fig. 15. In this figure the line 46 is shown with terminal apparatus which in this case is that of an ordinary polar duplex provided with a polarized relay 45, artificial line 47, polechanger 42 and generators 35$^a$, 35$^b$.

At stations C and D are located extraneous induction drain arrangements which drain such induction that is induced from the parallel wires PW in the manner already described. The induction drain arrangements are apart from that of either the transmitting or receiving apparatus in the circuit and the former is intended to care for extraneous currents mainly.

Figure 16:
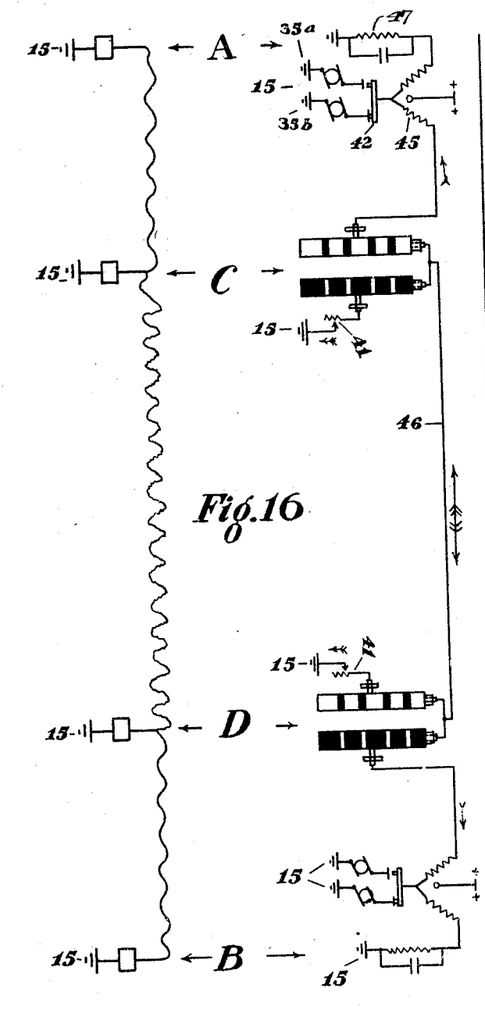
Fig. 16 graphically illustrates the effects of the arrangement located on the line as shown in Fig. 15 upon distorted signals flowing on said line, smoothing out the distortions before the signals arrive at each of the terminals.

Fig. 16 is a graphic illustration showing distorted signals on the line and the effect upon such signals after the induction drain arrangements have acted upon them, the general effect being to change the shape of the wave for the better reception of signals at the terminals.

It will readily be seen that my invention is capable of considerable modification without departing from the principles thereof. For instance, the commutators 6 and 7 may be stationary and the connecting brushes may revolve. The brushes may also be arranged to revolve bearing on the side surface of the commutators 6 and 7 instead of the periphery of the same.

Having thus described my invention, what I claim is:

1. In a telegraph circuit or the like to which is included one or more arrangements for draining currents induced upon said telegraph circuit by parallel wires, said drain arrangement or arrangements located on the line circuit ahead of the operating apparatus at either terminal of said telegraph circuit; said drain arrangement or arrangements consisting of a circuit interrupter connected directly into the line together with means for grounding the circuit simultaneously with the opening thereof; said combined interrupting and grounding arrangements operating independently of either the transmission or reception of the regular line signals.

2. In a telegraph circuit or the like to which is included one or more arrangements for draining currents induced upon said telegraph circuit by parallel wires, said drain arrangement or arrangements located on the line circuit ahead of the operating apparatus at either terminal of said telegraph circuit; said drain arrangement or arrangements consisting of a rotating segmented interrupter connected directly with the line together with means for grounding the circuit simultaneously with the opening thereof; said interrupting and grounding arrangement or arrangements operating independently of the transmission or reception of the regular line signals.

3. In a duplex telegraph circuit or the like, a bridging arrangement across the main line and artificial line coils of the main line relay or relays in said telegraph circuit; said bridging arrangement consisting of means whereby the incoming current from the line flowing across said bridging arrangement may be momentarily interrupted simultaneously with means for providing a ground path during such momentary interruptions.

4. In a duplex, multiplex or similar telegraph circuit to which has been added a resistance medium in parallel connection with a joint path, one branch of said joint path consisting of an arrangement for momentarily interrupting the current flowing in said branch; and a second path having means for momentarily providing a ground connection whereby foreign or extraneous currents may have full and free flow thereto during such momentary periods and means for compensating artificially for the effect created on the line of said circuit by the combined resistance medium, momentary interrupting means and momentary grounding means aforesaid.

5. In a duplex telegraph circuit or the like, a bridging arrangement across the main line receiving relay or relays in said telegraph circuit, said bridging arrangement consisting of a resistance medium and a capacity medium, means for momentarily grounding said resistance medium and means for momentarily grounding said capacity medium.

6. In a duplex telegraph circuit or the like, a bridging arrangement across the main line receiving relay or relays in said telegraph circuit, said bridging arrangement consisting of a resistance medium and a capacity medium means for momentarily interrupting the current flowing through said resistance medium, and means for momentarily grounding said capacity medium.

7. In a duplex telegraph circuit or the like, a bridging arrangement across the main line receiving relay or relays in said telegraph circuit, said bridging arrangement consisting of a resistance medium and a capacity medium; means for momentarily interrupting the current flow through said resistance means and means for momentarily interrupting the current flow through said capacity means.

8. In a telegraph circuit or the like through which a normal current flows said normal current operating apparatus at either or both terminals of said telegraph circuit; means for providing momentarily a ground path for said current simultaneous with the momentary interposition of a resistance medium in said telegraph circuit.

9. In a line conveying current for communication purposes an arrangement or arrangements for draining induction coming from parallel wires connected to said line; said drain arrangement or arrangements acting as a unit independent of the terminal operating apparatus on said line; said induction arrangement or arrangements consisting of a segmented interrupter means which momentarily interrupt the regular line current flow simultaneous with segmented interrupter means which provides a momentary ground path for said line.

10. In a telegraph circuit or the like, a revolving commutator means connected to said telegraph circuit which momentarily provides a ground path for the current flowing in said circuit and a revolving commutator means that momentarily introduces a resistance medium in said telegraph circuit simultaneous with the aforesaid momentary grounding of said telegraph circuit.

11. In a duplex telegraph circuit or the like, a revolving commutator means connected to said telegraph circuit which momentarily provides a ground path for the current flowing in said circuit and revolving commutator means that momentarily introduces a resistance medium in said telegraph circuit and means for compensating artificially for the resultant effect created in such telegraph circuit by the combination of said revolving commutator means that introduces momentarily a resistance medium and revolving commutator means which momentarily provides a ground path for the current flowing in the aforesaid telegraph circuit.

12. In a duplexed telegraph circuit to which is included one or more arrangements for correcting signal wave distortions or for counteracting effects upon transmitted telegraph signals from extraneous inductive interference; said arrangement or arrangements consisting of circuit interrupting means, said interrupting means operating asynchronously with respect to and independent of regular signals passing over said telegraph circuit; and means for grounding the circuit at the moment it is opened between said asynchronous interrupting periods.

13. In a line conveying current for communication purposes, an induction drain arrangement connected to said line, said induction drain consisting of means for momentarily interrupting the current flow in said line simultaneous with means for momentarily providing a ground path for said line, said ground path consisting of a medium of comparatively high resistance but having a maximum surface, said momentary ground path being in addition to the regular ground path forming a part of the circuit including the line aforesaid.

LOUIS CASPER.